(12) United States Patent
Dumoit et al.

(10) Patent No.: US 11,674,389 B2
(45) Date of Patent: Jun. 13, 2023

(54) MONITORING AND TARGETED RE-FRACTURING DESIGN BASED ON ACOUSTIC FRACTURE MEASUREMENTS

(71) Applicant: Seismos, Inc., Austin, TX (US)

(72) Inventors: Jeremy Dumoit, Richmond, TX (US); Morteza Nasizadeh, Austin, TX (US); Jakub Felkl, Bedford, NH (US); Panagiotis Dalamarinis, Austin, TX (US)

(73) Assignee: Seismos, Inc., Austin, TX (US)

( * ) Notice: Subject to any disclaimer, the term of this patent is extended or adjusted under 35 U.S.C. 154(b) by 0 days.

(21) Appl. No.: 17/091,922

(22) Filed: Nov. 6, 2020

(65) Prior Publication Data

US 2021/0140312 A1   May 13, 2021

Related U.S. Application Data

(60) Provisional application No. 62/933,127, filed on Nov. 8, 2019.

(51) Int. Cl.

| | |
|---|---|
| *E21B 43/26* | (2006.01) |
| *E21B 33/124* | (2006.01) |
| *E21B 49/00* | (2006.01) |
| *G01V 1/46* | (2006.01) |
| *G01V 1/133* | (2006.01) |
| *E21B 47/06* | (2012.01) |
| *E21B 33/12* | (2006.01) |

(52) U.S. Cl.
CPC ............. *E21B 49/00* (2013.01); *E21B 43/26* (2013.01); *G01V 1/133* (2013.01); *G01V 1/46* (2013.01); *E21B 33/12* (2013.01); *E21B 47/06* (2013.01); *G01V 2210/644* (2013.01); *G01V 2210/646* (2013.01)

(58) Field of Classification Search
CPC .............................. E21B 43/26; E21B 33/124
See application file for complete search history.

(56) References Cited

U.S. PATENT DOCUMENTS

| | | | | |
|---|---|---|---|---|
| 9,027,641 | B2 * | 5/2015 | Alekseenko | E21B 43/26 |
| | | | | 166/308.1 |
| 10,047,601 | B2 * | 8/2018 | Shampine | E21B 17/20 |
| 10,175,374 | B2 * | 1/2019 | Dusterhoft | G01V 1/306 |
| 10,253,598 | B2 * | 4/2019 | Crews | E21B 43/17 |
| 10,280,698 | B2 * | 5/2019 | Potts | E21B 23/01 |
| 2017/0138182 | A1 * | 5/2017 | Bogdan | G01V 1/50 |
| 2018/0245439 | A1 * | 8/2018 | Entchev | E21B 43/26 |
| 2022/0056793 | A1 * | 2/2022 | Korkin | E21B 47/00 |
| 2022/0082004 | A1 * | 3/2022 | Bannikov | E21B 43/267 |

* cited by examiner

*Primary Examiner* — Kenneth L Thompson
(74) *Attorney, Agent, or Firm* — Richard A. Fagin

(57) ABSTRACT

A method for treating a well includes hydraulically isolating an interval in a first well having a plurality of intervals along the first well, each interval having been fracture treated. A tube wave is induced in the first well in the isolated interval. Reflections are detected from the induced tube wave. Hydraulic boundary condition and hydraulic conductivity of a fracture connected to the first well in the isolated interval are determined using the detected reflections. A refracture treatment is performed in the isolated interval when the hydraulic boundary condition and the hydraulic conductivity are within a predetermine range.

16 Claims, 8 Drawing Sheets

4a)

4b)

4c)

a)

b)

c)

MONITORING AND TARGETED RE-FRACTURING DESIGN BASED ON ACOUSTIC FRACTURE MEASUREMENTS

CROSS REFERENCE TO RELATED APPLICATIONS

Priority is claimed from U.S. Provisional Application No. 62/933,127 filed on Nov. 8, 2019. The foregoing application is incorporated herein by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

The present disclosure generally relates to the field of evaluating hydraulic fracturing treatments of subsurface rock formations, and more particularly, to a method for enhancing and monitoring a refracturing treatment of a subsurface rock formation. More specifically, this disclosure relates to improving and monitoring the refracturing treatment in a rock formation using tube wave acoustic analysis.

In hydraulically fractured wells drilled through subsurface hydrocarbon reservoirs, for both cased and uncased ("open hole") completions, the production of hydrocarbons from the reservoir decreases rapidly during the initial period of production, without fully exhausting the potential of the reservoir rock formation to produce hydrocarbons. This decrease in hydrocarbon production is often accompanied by the production of sand and water from the formation. The well operator may choose to refracture the well to re-stimulate the previously fractured part of the reservoir formation, or to generate new sets of fractures to improve the reservoir connectivity, reservoir pressure, and ultimately profitably extract additional hydrocarbons from the reservoir formation.

The refracturing technique can extend the production life of a well, and can be economically efficient compared to all costs associated with drilling and completing a new well. On promising candidate wells, refracturing can be repeated more than once. Further, the fracturing designers or engineers may optimize the well economic factors by deciding on the time, type of implemented technologies, treatment type, and treatment parameters such as rates, and fluid volumes for the refracturing operation by having a better understanding of the in-reservoir state of fracture systems. The present disclosure focuses on targeted and optimized refracturing using tube wave measurements either from prior fracturing operations, from the well as is, or both.

There are a variety of known refracturing methods similar to high-pressure pumping of fluid and proppant into a formation through all open perforations in a well or selected isolated perforations or perforation intervals. Such pumping may result in re-opening previously closed fractures, creating new fractures, or, most commonly, a combination of both. Creating new fractures follows by isolating the well from previously fractured or refractured intervals by inserting sealing devices such as a ball, chemicals sealants, diverters, bridge or temporary/dissolvable plugs, or other techniques such as sliding sleeves to seal the perforations or openings to the formation that are not to be treated. Refracturing may also include re-perforating certain intervals of the well that prove not to have effective perforations through the well casing or liner.

The refracturing treatment techniques mentioned above may have a high upfront cost or may result in placing a permanent packer and fracture sleeves in the well, thereby limiting future accessibility. Other methods, for example, coiled tube fracturing and re-fracturing using isolation devices such as straddle inflatable packers, can stimulate the interval of interest without implementing a permanent set of packers and fracture sleeves in a well. In this case, the isolation devices are deployed at specific depths in the well to isolate an interval or fracture system from other fracture systems associated with nearby intervals in the well. The isolated interval can then be stimulated, e.g., with fluid mix including acid, proppant, or slurry; once stimulation is complete, a subsequent hydraulically isolated interval may be treated. The foregoing method has been of interest to operators by eliminating the upfront cost of permanent packers and fracture sleeves. Fracturing design engineers may also prefer this procedure over other "blind" methods for the ability to better target stimulation intervals by associating number and length of stimulation zones and fracture design.

A limitation of refracturing operations known in the art is the cost, often hundreds of thousands of dollars per "stage interval", and the lack of knowledge about the precise depleted intervals. Other options, such as the use of downhole tools to analyze near-wellbore regions for optimal refracturing candidate intervals are possible; however they may add time, costs, and additional risks such as getting the wireline tool stuck in the well; thus they may not be economical. Permanent or temporary installation of fiber optic sensors can also help identify higher and lower producing intervals in the wellbore, but those installations are also expensive, thus an exception to standard refracturing operations, and not common.

For optimal and economic refracturing operations, identification of wellbore intervals that are good candidates for refracturing is important. Additionally, more information about the current fracture, or network of fractures, such as length, width, and/or near-wellbore complexity, can assist the fracture design engineer in choosing optimum refracturing or restimulation parameters. In some cases, the refracturing operation could be avoided for particular intervals due to remaining acceptable hydraulic conductivity measurements of an already existing (previously fractured) fracture system, thus reducing refracturing costs. In other cases, a very poorly connected portion of the wellbore can be retreated more aggressively (for example with abrasive proppant) to achieve a much better conductivity to the reservoir.

SUMMARY

One aspect of the present disclosure is a method for treating a well. Such method includes hydraulically isolating an interval in a first well having a plurality of intervals along the first well, each interval having been fracture treated. A tube wave is induced in the first well in the isolated interval. Reflections are detected from the induced tube wave. Hydraulic boundary condition and hydraulic conductivity of a fracture connected to the first well in the isolated interval are determined using the detected reflections. A refracture treatment is performed in the isolated interval when the hydraulic boundary condition and the hydraulic conductivity are within a predetermine range.

In some embodiments, the refracture treatment is not performed when the hydraulic boundary condition and the hydraulic conductivity are above a respective selected threshold.

Some embodiments further comprise: hydraulically isolating a subsequent interval in the first well; repeating the inducing a tube wave, detecting reflections, determining hydraulic boundary condition and hydraulic conductivity; and performing a refracture treatment in the subsequent interval.

Some embodiments further comprise performing the inducing a tube wave, detecting reflections, determining hydraulic boundary condition and hydraulic conductivity in a second well proximate to the first well, and omitting the performing the refracture treatment in the isolated interval when the hydraulic boundary condition and hydraulic conductivity in the second well indicate pressure communication between the first well and the second well.

In some embodiments, the inducing a tube wave comprises inducing a pressure pulse.

In some embodiments, the pressure pulse is induced by water hammer.

In some embodiments, the performing a refracture treatment is performed while the isolated interval remains isolated.

In some embodiments, the isolating the interval is performed by inflating spaced apart packers along a coiled tubing extended into the first well.

In some embodiments, the refracture treatment is performed using the coiled tubing as a fluid conduit.

Some embodiments further comprise repeating the inducing a tube wave, detecting reflections, determining hydraulic boundary condition and hydraulic conductivity; and performing a refracture treatment in the isolated interval when the hydraulic boundary condition is within the first selected threshold and the hydraulic conductivity is within the second selected threshold.

In some embodiments, the isolating the interval is performed by inflating spaced apart packers along a coiled tubing extended into the first well.

In some embodiments, the refracture treatment is performed using the coiled tubing as a fluid conduit.

Some embodiments further comprise at least measuring pressure in a second well to determine presence of fluid communication between the first well and the second well.

The method of claim 1 wherein the type of refracturing treatment is based on the measured fracture properties.

In some embodiments, a remediation of a previously fracture treated interval in the first well is performed using at least one of diverters, abrasive proppant, and reperforating the previously fracture treated interval.

In some embodiments, the first threshold value is determined prior to the hydraulically isolating the interval.

In some embodiments, the second threshold value is determined prior to the hydraulically isolating the first interval.

In some embodiments, the second threshold is determined based on a fracture conductivity determined after an initial fracture treatment of the interval.

Other aspects and possible advantages will be apparent from the description and claims that follow.

DETAILED DESCRIPTION

This disclosure sets forth a method for improved targeting of refracturing treatment in hydraulically isolated interval(s) of a well by examining the relevant fracture system(s) with acoustic wave (tube wave) analysis. The exact isolation method chosen is left to the discretion of the user, and the method described in this disclosure is generalized for all suitable isolation methods. Treatment choice, or choice not to treat any specific evaluated isolated interval is left to the discretion of the user of the present method(s).

Figure 1:
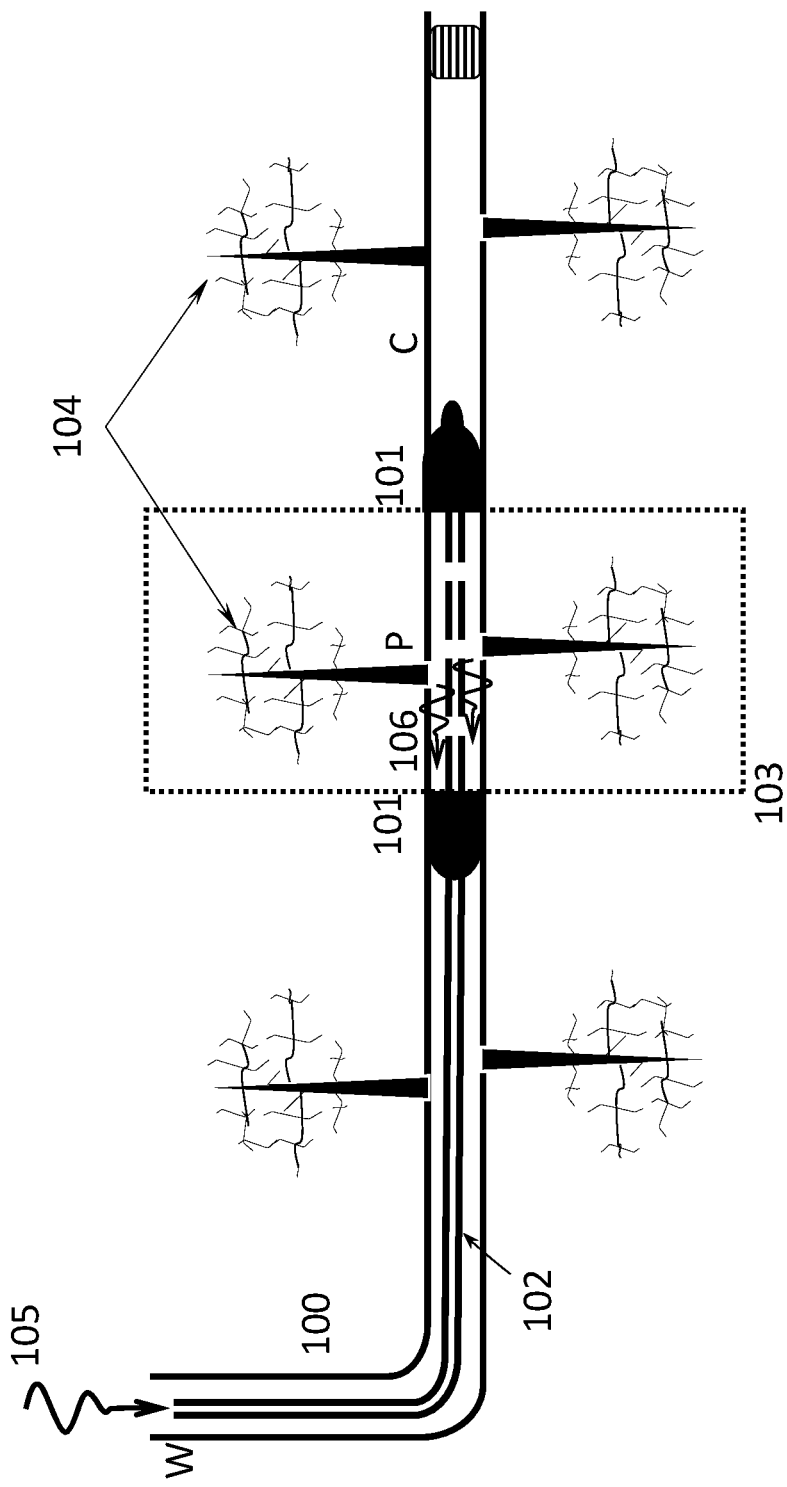
FIG. 1 shows examples of well interval isolation apparatus and the position of isolation devices in regards to the fracture systems (not to scale).

An example implementation, according to this disclosure, may include a setting similar to what is shown in FIG. 1, as may be used in a refracturing operation. Isolation devices (e.g., inflatable straddle packers 101) may be deployed at chosen depths 103, and inflated to isolate an axial interval between them in a well W 100. The interval may have an existing fracture system 104, hydraulically connected to the well W, e.g., by perforation(s) P through a well casing C. A coiled tubing 102, may be filled with fluid and is connected to equipment disposed at the surface (not shown separately) capable of pumping fluid and maintaining pressure in the isolated interval. The well W, 100, does not require casing; the setting shown in FIG. 1 is only an example, and in other implementations the well W may be an "open hole."

As may be observed in FIG. 1, any well may have more than one axial interval similar to the interval between chosen depths 103 wherein the well W is connected to fracture systems by associated perforations P (or through open hole in uncased wells). In methods according to this disclosure, one or more such intervals may be hydraulically isolated and evaluated (for example for retreatment operation) as explained further below.

Figure 2:
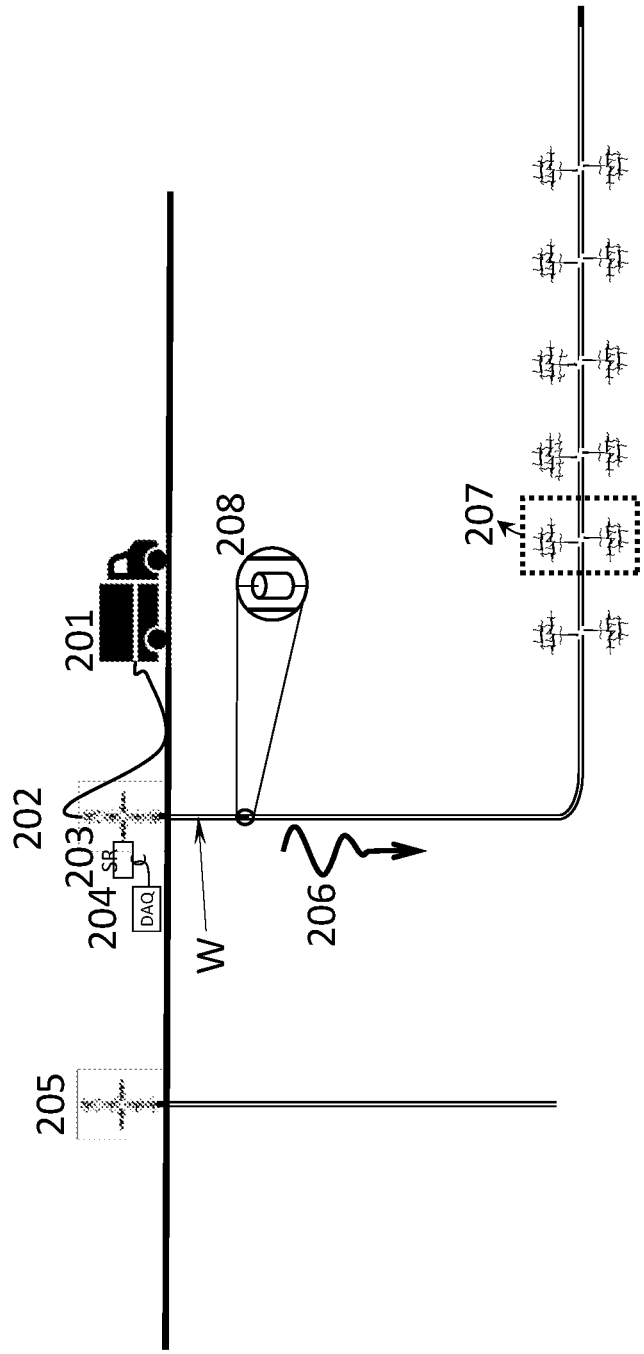
FIG. 2 shows a well equipment arrangement that may be used to acquire signals for implementing a method according to the present disclosure.

Referring to FIG. 2, equipment used in data acquisition may comprise modules acting as: (i) an acoustic energy source (e.g., water hammer or a tube wave generator), 203; (ii) an acoustic receiver (e.g., a hydrophone), 208 or built as part of the source, 203; and (iii) a signal processing unit, 204, that are connected to a wellhead 202 or at a location near the wellhead, 202, and may operate remotely or be programmed to perform automatically. The foregoing equipment may be used on the well W, which may be referred to later herein as the "first well." Operation of the source 203 and the receivers 208 may take place without any interference to a treatment or refracturing operation. The acoustic source 203 may include a device(s) able to generate a tube wave, 206, by inducing a pressure pulse (e.g., an abrupt change in fluid injection rate, which is usually called "water hammer") in the first well W. Analyzable reflected tube wave(s) can also be generated by any changes in hydraulic impedance, pumping rate into or out of the well W or other known means (for example air guns). 201 symbolically represents surface equipment for pumping fracture and evaluating fracture treatment, which may include pump trucks, wireline, coiled tubing, etc. and control center that may be used in a refracturing operation.

The tube wave 206 travels down the coiled tubing (102 in FIG. 1) inside the casing (if the first well W is so configured) and reflects off obstacles or changes in the well, shown generally at 207, such as a fracture system at the depth where the isolation devices (101 in FIG. 1) isolate the first well W hydraulically to the coiled tubing in the interval defined between the isolation devices (101 in FIG. 1). The reflections carry information about the downhole conditions, and travel back within the coiled tubing (102 in FIG. 1) to the surface where the pressure or acoustic signals are detected by the receiver or receivers 208 (e.g., hydrophones, pressure transducers, accelerometers, fiber optic line, or other known sensors), recorded, and processed by the signal processing unit 204. The receiver(s) 208 may generate signals in the form of a time series of pressure P(t) and/or pressure time derivative dP/dt. In some embodiments, location of all the foregoing equipment may be at the surface, in or near the first well W, but the signal generators and receivers can also be below surface (e.g., in the first well W below ground level). The signal processing unit 204 may be in signal communication with the source 203 and may comprise (none of the following shown separately) a source controller, a signal detector, a signal digitizer, a power supply/source, and a recording device to record the digitized detected signals. The source controller (not shown) may be a microcomputer, microprocessor or other control device configured to actuate the source 203 at selected times, provide a feedback loop, and cause the sensors 208 to record signals at selected times, or continuous recording may be used. The signal processing unit 204 may comprise an absolute time reference for the recorded signals, e.g., a global positioning system (GPS) satellite receiver. Other survey settings, such as recording the tube waves at a specific depth in the well W, using fiber optic sensing, wireline tools, or other devices, are also possible. A nearby well, 205, may be present, and may also be instrumented similarly as the first well W in FIG. 2 to measure possible hydraulic connectivity—direct or indirect—or pressure increases ("frac hits") when various sections of the first well, are being treated. "Nearby" in the present context means that the nearby well 205 penetrates the same reservoir formation as the first well W, and is laterally no more distant from the first well W than would enable hydraulic communication between the first well W and the nearby well 205 to be detectable by pressure or other measurements in the respective wells.

In some cases, the tube wave signals may be compressional waves or shear waves generated by other sources than those illustrated in FIG. 2, such as a fluid pumping unit 201, wellhead 202, or wellbore impulsive devices in the casing (C in FIG. 1), or the coiled tubing (102 in FIG. 1). In real-time applications, if there are multiple pressure wave or acoustic sources present, additional filtering may take place to eliminate extraneous signals, or signal conditioning performed to utilize pumping-induced signals.

Tube wave reflections are influenced by acoustic source signature, acoustic wave velocity, wellbore/coiled tubing attenuation, fluid properties, pressure, temperature, packer properties, depth, casing discontinuities such as a change in diameter, and, most relevant to the present disclosure, by the well condition within or near the isolated interval (104 in FIG. 1). Such condition includes the state of the fractures, as shown in US Patent Application Publication No. 2018/0320514, filed by Felkl et al. The reflections from the downhole features 207 may contain frequency components in the range of about 0.1-100 Hz and can be used in computer simulations, which solve partial differential equations governing tube wave propagation and fluid flow in the well, with various objects (e.g., coiled tubing, packers, perforations and fractures) in the well described by models having a limited number of model parameters.

The description below describes a similar model which represents perforations (P in FIG. 1) as cylinders of length L. In some cases, rock formation permeability k can be estimated by modeling an oscillatory Darcy flow within the perforation interval (Eq. 1). The perforation obeys a 1D diffusion equation for pressure, valid in a cylinder of length L and cross-sectional area A uniformly filled with a material having permeability k, fluid viscosity $\mu$, fluid compressibility $\beta$, and rock formation porosity $\phi$ $$D = k/\mu\beta\phi \qquad (Eq. 1)$$

The fluid flow in the well can be derived from a pressure perturbation at the perforation mouth and a volumetric flow rate into/out of the perforation:

$$Z(\omega) = \mu/kA \text{"coth"}(\sqrt{(-i\omega/D)}L)/\sqrt{(-i\omega/D)}, \qquad (Eq. 2)$$

where $\sqrt{(D/\omega)}$ is the diffusion length at angular frequency $\omega$. As permeability k becomes large, then so does diffusivity (D) and the diffusion length. When the length of diffusion is much longer than the perforation length L, then $\sqrt{(\omega/D)}$ L<<1 and a Taylor expansion can be used. The result provides the hydraulic impedance value of the perforation(s):

$$Z(\omega) \approx 1/(-i\omega AL\phi\beta) \qquad (Eq. 3)$$

The main result is a single solution of angular frequency ($\omega$), fluid viscosity ($\mu$), aperture width (w), permeability (k), wellbore radius (R), sum of fluid compressibility and pore compressibility ($\beta$) times porosity ($\phi$) that is proportional to the perforation volume. Note that AL is perforation volume and AL $\phi$ is the pore volume (equal to the fluid volume). Therefore, the combined parameter of relevance is the product of volume and compressibility. This model, although more applicable to perforation geometry, may perform better in certain inversions for pre-fracture (i.e., perforation only) conductivities. Presence or absence of natural fractures may also affect the measurement and model inversion. Other models taking the fracture system into account are described in US Patent Application Publication No. 2018/0320514, Felkl et al., incorporated herein by reference. The method disclosed can be practiced independent of a model or inversion choice.

Figure 3:
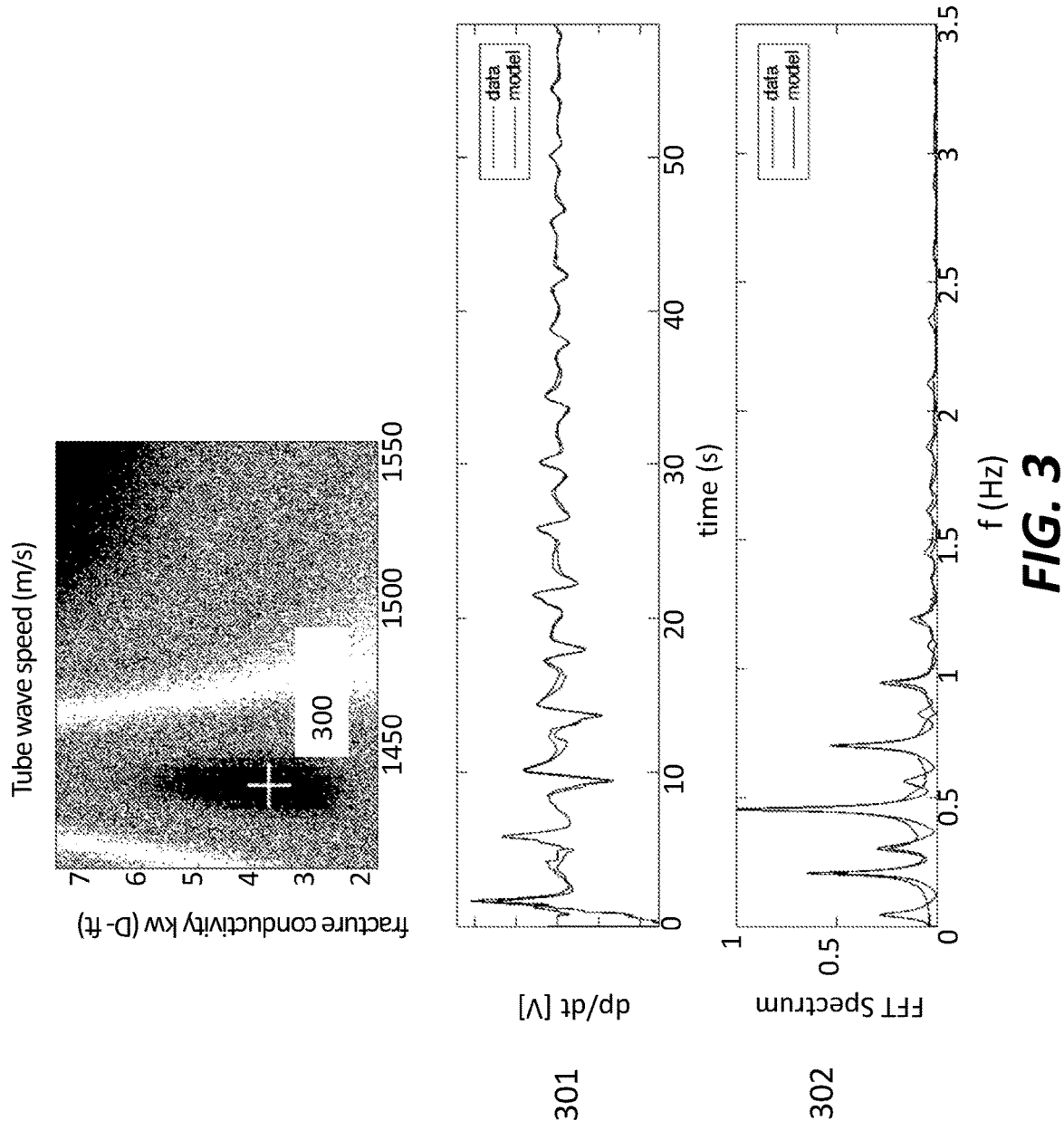
FIG. 3 shows an example of how closely the best-fit inversion model matches tube wave reflection data in time and frequency domains; this model may be used for isolated interval evaluation.

FIG. 3 shows comparisons between the above model and recorded data in both the time domain 301 (i.e., full waveform inversion) and the frequency domain 302 (i.e., matching frequencies and quality factors of resonant modes of the well and reservoir system). Best-fitting parameters, which may be determined by nonlinear optimization, 300, to minimize misfit in the time and/or the frequency domain in full-waveform inversion can be used to solve for fracture system properties such as conductivity, geometry, fluid viscosity, aperture, permeability, wellbore radius, the sum of fluid compressibility and pore compressibility times porosity. Some of those parameters, if known or estimated (for example using models, logs, known rock properties, constrained fracture height between two layers, etc.) can represent constraints to reduce the size of the potential solution space for a more accurate determination.

The hydraulic conductivity of the existing fracture system, (104 in FIG. 1) in the isolated well interval (103 in FIG. 1) may be defined and determined as the product of harmonic average of permeability and the width of the proppant-filled and/or fluid-filled fracture (or fracture system) within the isolated interval. Typically, the width of the fracture or perforation is determined by the characteristics of the injection or treatment parameters and the perforating gun used to treat the well (W in FIG. 1). In general, impedance contrasts between the well (W in FIG. 1) and that of fracture (or fracture system) can help determine the conductivity of the near-wellbore region by analyzing the incoming (incident) and returning (reflected) tube waves, for example, as described in U.S. Patent Application Publication No. 2018/0320514 cited above. The acoustic reflectivity is indicative of the condition of the fracture system or perforation by comparing the characteristics of incident and reflected waves/events. Note that a fracture as used in this description can more generally mean a fracture network, fracture system, or a porous medium hydraulically connected to the well.

Figure 4:
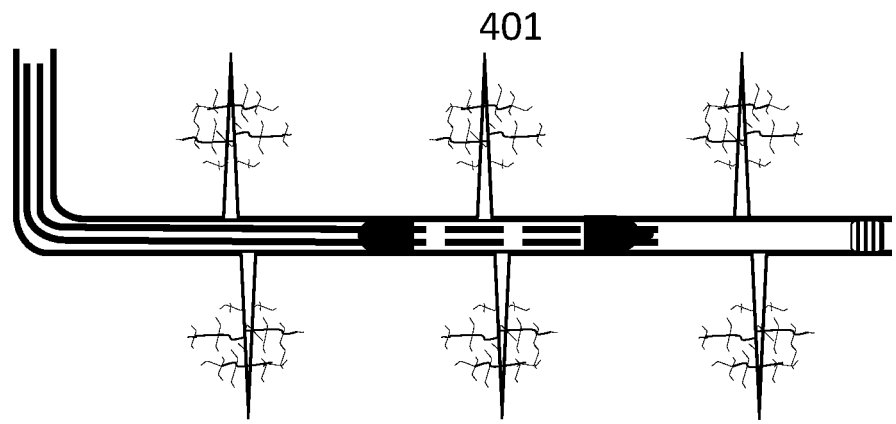
FIG. 4 shows examples of various fracture system conditions within the isolated interval (not to scale).
Figure 4:
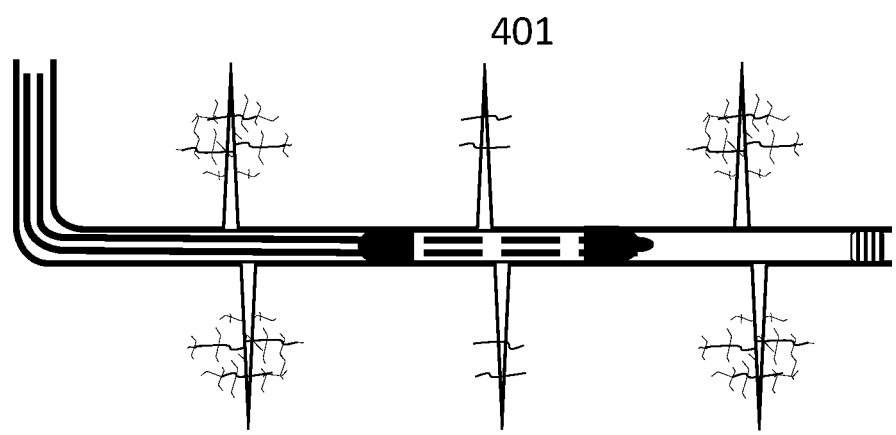
Figure 4:
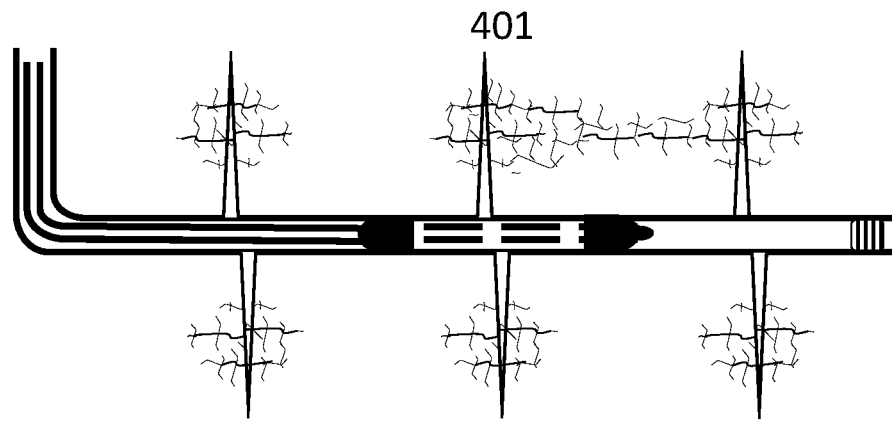

The fracture or fracture system can be characterized by an analysis of the measured hydraulic conductivity, as shown in FIG. 4, where 401 is the fracture system and perforation conditions in the isolated interval. An isolated interval with a high estimated hydraulic conductivity can be due to a good connectivity fracture system within the reservoir rock, at 4a, whereas a poor fracture connectivity at 4b may have a low fracture hydraulic conductivity. However, excessive hydraulic conductivity can be due to fracture connectivity between the interval of interest with an adjacent interval, as shown at 4c.

Figure 5:
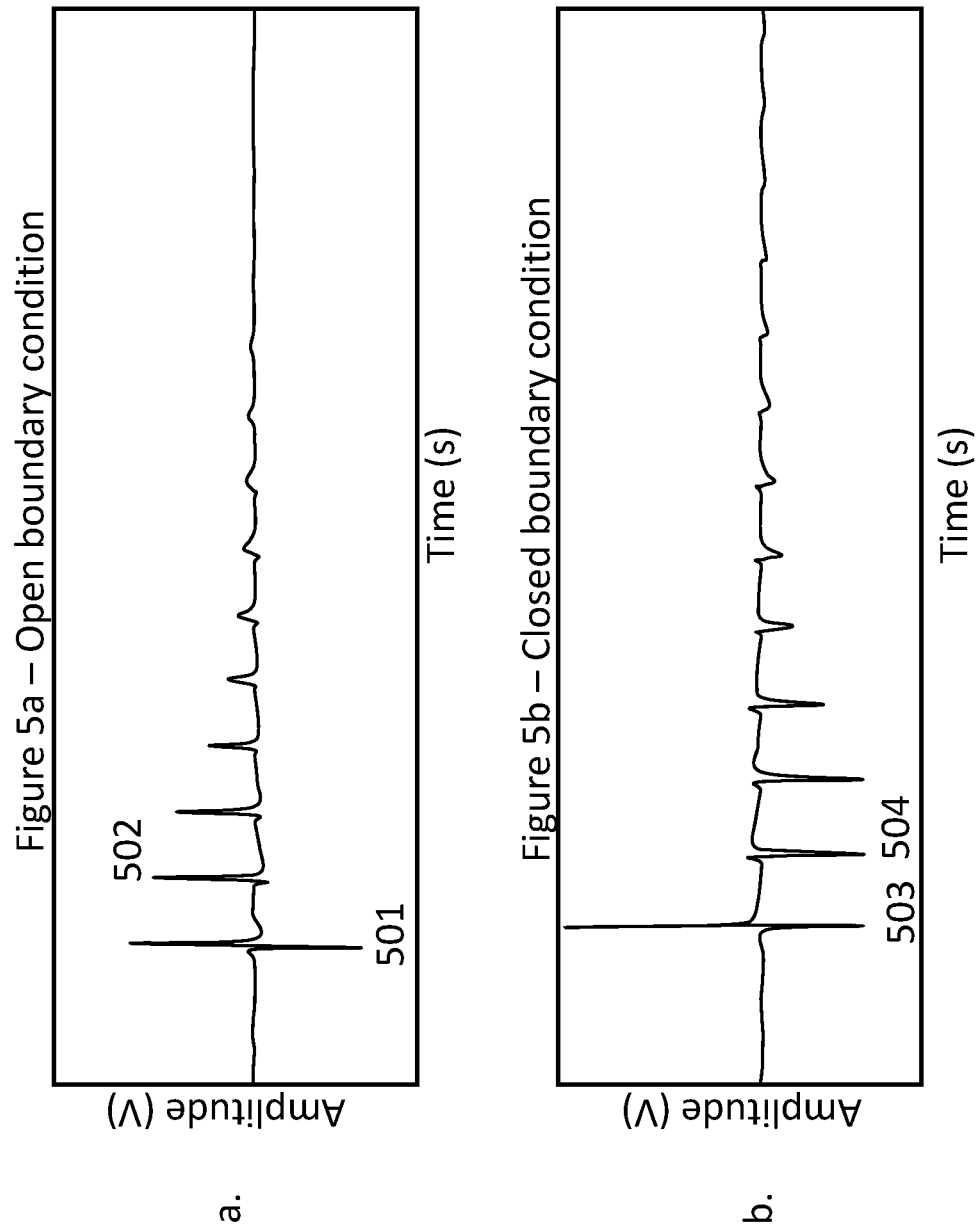
FIG. 5 shows a graph of reflected tube waves that have the same (bottom graph) and opposite (top graph) reflected polarities indicating an open and closed system of interest (hydraulic boundary condition), respectively.
Figure 6:
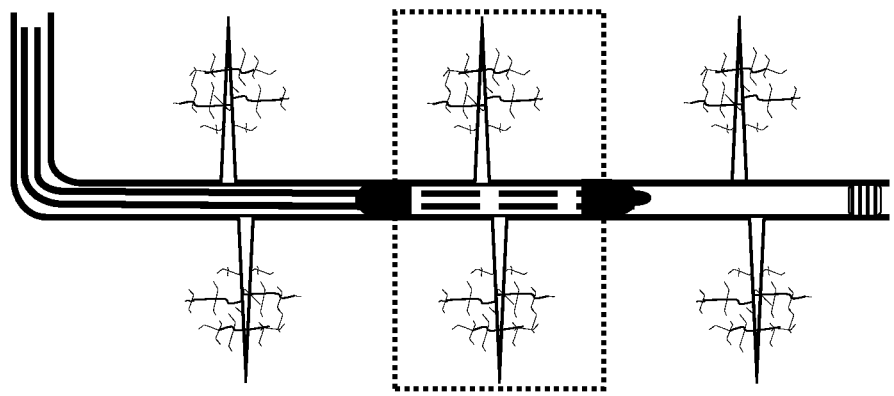
FIG. 6 shows an example of hydraulic boundary conditions within the dashed box isolated interval.
Figure 6:
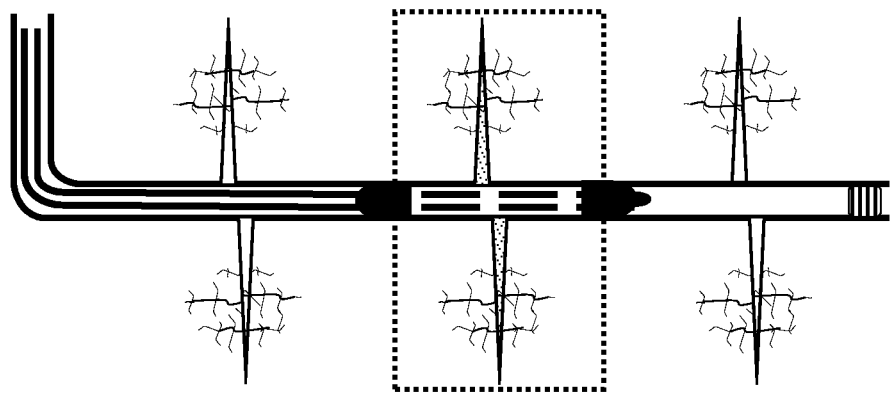
Figure 6:
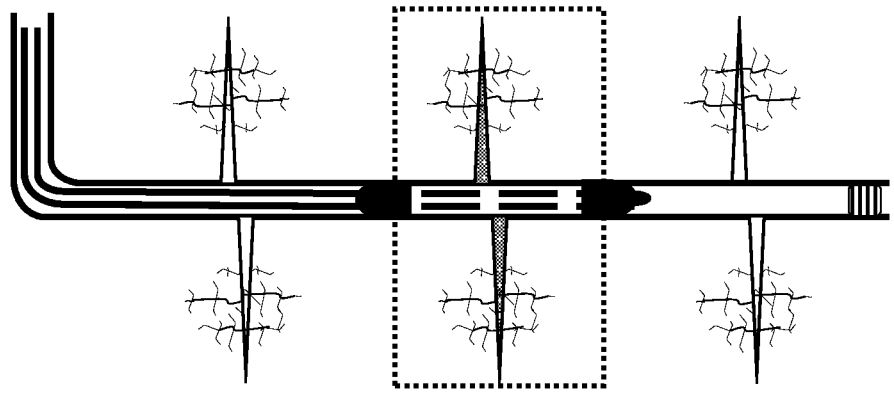

Generally, a low near-wellbore hydraulic conductivity indicates an isolated or ineffective fracture system within the examined interval. However, the hydraulic boundary condition is also important to understanding the existing fracture system. FIG. 5 shows two recording examples with their corresponding hydraulic boundary conditions. Note that source pulses 501 and 503 have generally the same shape, and mostly vary in amplitude. Graph a in FIG. 5 displays an open hydraulic boundary condition of a single perforation determined by an opposite (−) polarity of the reflected wave, 502, compared to the source wave, 501, i.e., a tube wave. The reflection coefficient, R, in this case, is close to −1. The closed hydraulic boundary condition, shown in graph b in FIG. 5, can be distinguished by the reflections, 504, having the same polarity (R~+1) as the incident tube wave 503. Closed hydraulic boundary condition is indicative of very poor (or zero) conductivity or a lacking perforation hydraulic connection to the reservoir within the isolated interval. It would also be possible that the isolated interval has no perforations at all, for example, if explosive charges used to produce perforations failed to penetrate the well casing. Additionally, a partially closed (or partially open) hydraulic boundary condition can be detected by waveform evaluation of the reflection polarity, which usually lies between the open and closed hydraulic boundary conditions. The hydraulic boundary condition is depicted for various perforation states within an isolated interval (dashed box) in FIG. 6. The state may be open as shown in panel a, partially open as shown in panel b, or nearly closed as shown in panel c.

By reviewing the analyzed information from the tube wave acoustic measurements given the fracture system conductivity and the hydraulic boundary condition, the operator can analyze various isolated intervals in the well and identify any underperforming intervals along the well. An underperforming interval may be immediately treated once identified, while the coiled tubing (102 in FIG. 1) is still in the well, using equipment on the surface, after which a subsequent interval can be isolated and investigated. The operator may empirically or a priori choose to define a threshold conductivity value as a decision cutoff for when to retreat a particular interval, thus saving costs by not treating satisfactorily reservoir-connected intervals. A simplest decision process may be to treat every evaluated interval that shows a "closed" hydraulic boundary condition (i.e., the same polarity tube wave reflection as the incident tube wave). If an interval shows no perforations or no measurable hydraulic connections to a reservoir, that interval may be (re)perforated instead of attempting a (re)fracture treatment In particular, satisfactory hydraulic conductivity will have both open hydraulic boundary condition and a reasonably high determined conductivity (kw product). When the polarity indicates an open hydraulic boundary condition, the well intervals may be predicted to have acceptable connectivity with the reservoir rock. However, a system with an open hydraulic boundary condition can be connected to an ineffective fracture system, which can be determined from the measured hydraulic conductivity, kw (higher values will mean better or more effective near-wellbore fracture systems). In the case of a closed or partially closed boundary condition, the operator may be informed of poor connectivity, in order to possibly plan suitable refracturing parameters and techniques. The condition of the fracture system and its suitability for remedial treatment (including refracturing) may have a defined decision process based on experience in a particular subsurface rock formation, or with recompletions in general. This can be either set by using post fracture treatment measurements in each isolated interval ("stage") of the subject well after initial fracture operations as a set value, or by setting a specific threshold based on rock properties and the formation or geologic region (e.g., a basin).

An understanding of the downhole condition within a defined interval may enable the well operator to make better decisions with respect to refracture treatments and, more specifically, choosing a strategy to address the downhole issues. For example, the intervals with acceptable hydraulic conductivity and open hydraulic boundary conditions may be omitted from the refracturing treatment operation plan to reduce non-productive time (shorten the time to put the well back on production) and reduce the cost of the operation (forego refracturing of certain stages or regions). However, in the case of an identified zone or interval having poor perforation connectivity (closed hydraulic boundary condition), the operator may desire to seal off existing fracture(s) and/or create new perforation(s), or possibly use a more abrasive proppant to enlarge existing perforations. The well operator may choose only to perform stimulation (e.g., refracturing) when the hydraulic conductivity is low with an open hydraulic boundary condition within the isolated interval and when the expected hydrocarbons accessed are economically recoverable. In this procedure, a small injection test may be used for the characterization of the far-field (FF) connectivity of the fracture system. Fracture crimp and isolation can occur in the near well region, but there are instances where isolation of the FF system may have occurred, and another approach to the re-fracture process may need to be used.

When the fracture treatment engineer chooses to skip or treat an examined isolated interval of the well and move on to another interval, he or she may also decide to adjust at least one refracture treatment pumping parameter on the next interval selected for treatment. In some embodiments, the at least one pumping parameter comprises one or more of proppant concentration, proppant density, proppant amount, proppant particle size distribution, proppant particle shape, fluid type/composition, fluid viscosity, fluid viscosity change rate, fluid pumping rate, fluid temperature, fluid chemical composition, chemical additives (e.g. viscosifiers or acids), co-injection of energized gases (nitrogen, $CO_2$, propane, methane) in both liquid and gas phases, injection of petroleum distillates, or pH of injection fluid (acid/base), fluid pumping pressure, diverter type (if any), perforation schema (perforation location, number of perforations and density, angle of perforations, size of perforations, depth of perforations), well bridge plug type, and interval length. Other analyses, such as borehole fluid hydrocarbon concentration, tracer logs (if available), prior per-stage hydraulic conductivity (kw) measurements, and composition from the isolated interval, can give a better understanding of reservoir content along with the same interval to perform cost-benefit analysis of refracturing a given interval. The refracturing treatment parameters may be defined by the refracture treatment designer based on the type of conductivity loss, either near-field or far-field.

In some cases, measurements of near field conductivity or other measurements made before putting the well on production (i.e., initiating fluid production from the well) are possible. Such measurements may be acquired, for example, as described in US Patent Application Publication No. 2018/0320514 filed by Felkl et al. immediately after an initial fracturing operation is completed. Such measurements can help the well operator to identify for re-treatment intervals that shortly after the initial fracturing demonstrate poor connectivity between the well and the formation, and thus could be labeled as "under-fracked." Other methods of measuring properties in the well, such as conductivity, near wellbore complexity, far-field conductivity or fracture length (see, for example, International Application Publication No. WO/2019/089977) are possible, some of which may use downhole tools/probes, downhole acoustic tools, fiber optic sensing, video imaging, or even diagnostic mini-frac injection tests, electromagnetic proppant, temperature, and radiation.

Figure 7:
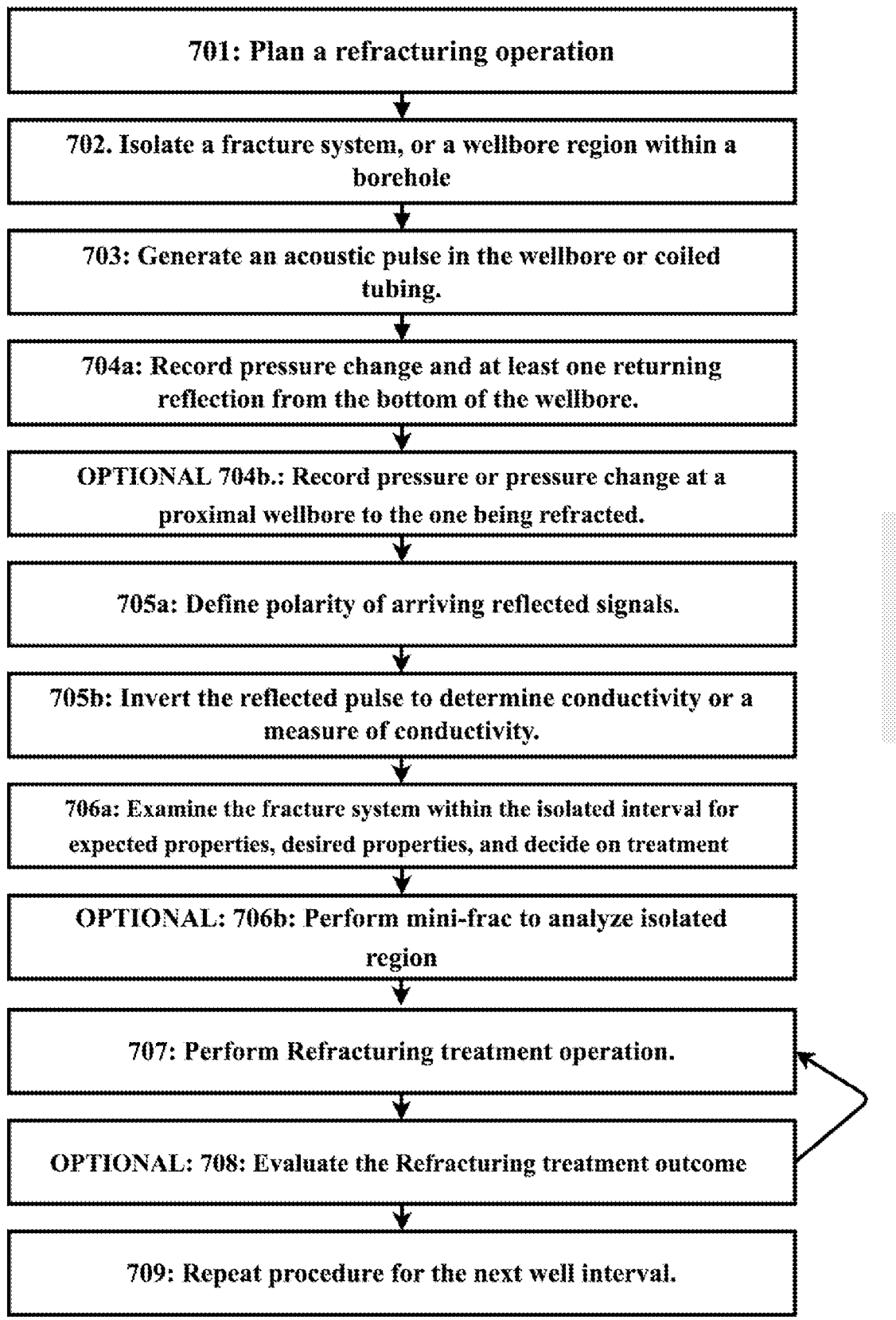
FIG. 7 shows a flow chart of an example method according to the present disclosure.

A flow chart of an example embodiment of a method according to this disclosure is shown in FIG. 7.

At 701: Plan a refracturing operation

The planning for a refracturing operation may include consulting any available data, e.g., well logs, tracer logs, reservoir models among other data, and may also include previous post-fracture interval-isolated near-field conductivity measurements or indexes to identify one or more selected target intervals of the first well for refracturing. The planning may also include a basic selection of fluids, proppants, coiled tubing, sliding sleeves (if used), and desired fracture treatment fluid volumes. A well that has previously been refractured may also be further refractured.

At 702: Isolate a fracture system, or an axial interval within the first well.

Arrange the well such as shown in FIG. 1, with the purpose of isolating hydraulic communication within the well to the specified interval(s) by any isolation methods or apparatus.

At 703: Generate an acoustic pulse in the first well (Source: e.g., water hammer, tube wave source, or pressure pulser) in the coiled tubing.

A water hammer or acoustic signal (to generate tube waves) may be generated by a multitude of means, by active pulsing: for example, by removing or inserting a small volume of fluid into the wellbore, changing a flowrate, or opening/closing a valve, turning on/off a pump, etc. Such a signal will propagate along the wellbore (coiled tubing) and dissipate over time of several reflections. In some embodiments, the first well may have equipment such as shown in and explained with reference to FIG. 2 for purposes of carrying out generating an acoustic pulse in the well.

At 704a: Measure and record pressure signals.

A pressure (pressure P(t) may be measured for a selected length of time and/or pressure time derivative dP/dt) may be measured to detect at least one water hammer/tube wave reflection in the first well. Equipment as explained with reference to FIG. 2 may be used to detect and record such pressure or pressure time derivative signals.

The generated tube wave(s) propagate(s) along the first well and interact with the near wellbore region, in particular in the bottom, uncased, perforated, and exposed reservoir section of interest. The reflections are analyzed according to their polarity (705a) and processed, e.g., inverted, to determine hydraulic conductivity (705b), for example and without limitation, by the method disclosed in US Patent Application Publication No. 2018/0320514.

In some embodiments, at 704b: In some embodiments, pressure (P) or pressure time derivative (dP/dt) may be measured in a nearby well to the first well. If there is a suspected hydraulic communication between the first well, (W in FIG. 2) and the nearby well (205 in FIG. 2), the measurements made in the second well can indicate existence of such communication. If such communication exists, the well operator may forego treating such interval in the first well because a substantial amount of treatment fluid and proppant may be lost into the nearby well rather than improving fracture conductivity. Further treatment may also cause unsafe pressure levels in the nearby well (205 in FIG. 2). The well operator may instead pump diverter into the first well and/or the second well to limit such cross-well communication.

At 705a: Determine and note the polarity of arriving reflected signals.

The polarity of a tube wave is determined by comparison of the orientation of the oscillations between the initial generated wave (incident wave) and the detected reflection. A pulse returning with the same polarity as the incident wave will have a reflection coefficient that is positive (+) while one returning with opposite polarity is negative (−). See FIG. 4. The polarity of the reflected signals may indicate the hydraulic boundary condition. As explained above, if the boundary condition is determined to be closed, the operator may choose not to refracture treat the isolated interval, or may choose a further treatment, e.g., reperforating, to change the hydraulic boundary condition. If such further treatment is chosen, the operator may then choose to repeat 703, 704a, 704b and 705 to determine whether to continue the process as set forth below, to repeat the further treatment to change the boundary condition, or to abandon the isolated interval.

At 705b: Process the detected reflected wave(s) to determine conductivity or a parameter related to conductivity. If at 705a the boundary condition is determined not to be closed, the detected reflection(s) may be inverted or otherwise processed to determine the near-field, near-well fracture conductivity, as a non-limiting example, as described in US Patent Application Publication No. 2018/0320514, Felkl et al. The near field fracture conductivity will indicate the extent to which the isolated interval is connected with the reservoir formation adjacent to the first well. Higher conductivity may indicate better (fluid) connection.

At 706a: Examine the fracture system within the isolated interval for expected properties (e.g., conductivity), desired properties, and decide on possible treatment of the isolated interval. The determined hydraulic conductivity and condition may be used to identify any interval(s) warranting additional refracturing treatment. Based on the conductivity determined, the operator may decide whether to proceed to refracture the isolated interval, or to move on to evaluate/treat a subsequent axial interval in the first well.

Machine learning workflow, trained on historical completion or production data, or known and desired fracture properties (e.g., length), along with their associated geological profiles, may be used to establish a threshold to help in such determination. The historical data used may be selected from adjacent best-performing intervals (stages) or nearby wells for the purpose of model training. The fundamental segmentation of machine learning models may be designed to perform supervised or unsupervised and use regression or classification models that best fits the well profile. Machine learning and artificial intelligence may be applied at this step or any time to take advantage of larger datasets on fracturing and/or refracturing within a geological region, formation, well-type, etc. Other methods, such as predictive models, may also be used to define a threshold instead machine learning models. The threshold can be established to help in such determination.

Additionally, other known information, if available, can help guide the decision and treatment parameters as necessary. For example, if the pre- and post-treatment (from the initial fracturing treatment) hydraulic conductivity is available, it can help to guide the decision. An operator may also chose to target having the same conductivity value post-refracturing as existed after a prior (or the first) fracturing treatment, or a same conductivity value across all separate axial intervals (stages) in the first well. Additional determinants can be used to define the threshold, such as known production from various axial intervals such as can be measured by flow meters or fiber optic sensing.

After such examination, the operator may choose to refracture, not to refracture, or to further evaluate the isolated interval (as in 706b below). Generally, the operator may choose to refracture any number of axial intervals in the first well based on the foregoing measurements and determinations.

In some embodiments, at 706b: Perform a small Diagnostic Fracture Injection Test (DFIT) can be performed in the isolated interval to analyze the far-field (beyond near-wellbore conductivity) of the isolated fracture network. During a DFIT, injection of a small, known volume of fluid is used by fracturing engineers to estimate the fracture properties. An example publication concerning DFIT is, Barree, R. D., Miskimin, J., and Golber, J., Diagnostic Fracture Injection Tests: Common Mistakes, Misfires, and Misdiagnoses, May 2015. (SPE-169539-PA). DFIT can provide additional data points for the operator to decide whether a refracturing operation is warranted, especially if the conductivity measurement falls within some uncertainty whether to proceed.

At 707: Perform a refracturing treatment operation in the isolated, evaluated interval.

The operator may choose to perform a refracturing treatment operation for the isolated interval when it is determined to have undesirable hydraulic connectivity or other properties as determined at 706a, and in some embodiments after a mini-frac or injection test as at 706b.

Optionally at 708: Evaluate the refracturing treatment outcome

Evaluate the refracturing treatment of the currently isolated stage by repeating the actions explained with reference to 703 to 706a (and 706b if used) inclusive to assure improvement and efficiency (for this a method as disclosed in US Patent Application Publication No. 2018/0320514 may be used). For example, a mini-frac as shown at 706b or other analysis using downhole tools or sensors can also be used in this evaluation. If the refracturing does not result in desired fracture conductivity measurements or other properties, then the treatment can be repeated until it does.

At 709: Repeat the above procedure (from 702-708 inclusive) for at least one or more subsequent well intervals. Repeat the isolating, measuring, deciding whether to treat or not and how for the next well axial interval until the entire desired well portion or entire well is evaluated and refractured.

Other methods, according to this disclosure, may provide an evaluation procedure to determine the change in hydraulic conductivity of the fracture system and its boundary condition after a refracturing operation. Such procedure repeats the actions explained with reference to 702 to 707 in FIG. 7, and compares the initial analysis with the fracture system analysis made after refracture treatment substantially in real-time. In some embodiments, the secondary fracture system analysis can be performed after completing the refracturing treatment, as shown at 708. In some cases, the fracture system analysis from the initial fracturing or a post-fracturing treatment operation might exist in which can better contribute to the evaluation of refracturing treatment according to the primary hydraulic conductivity of the stage according to its interval. In this case values of conductivity after a stage or interval was treated for the first time can be compared to the post-refracturing values.

Figure 8:
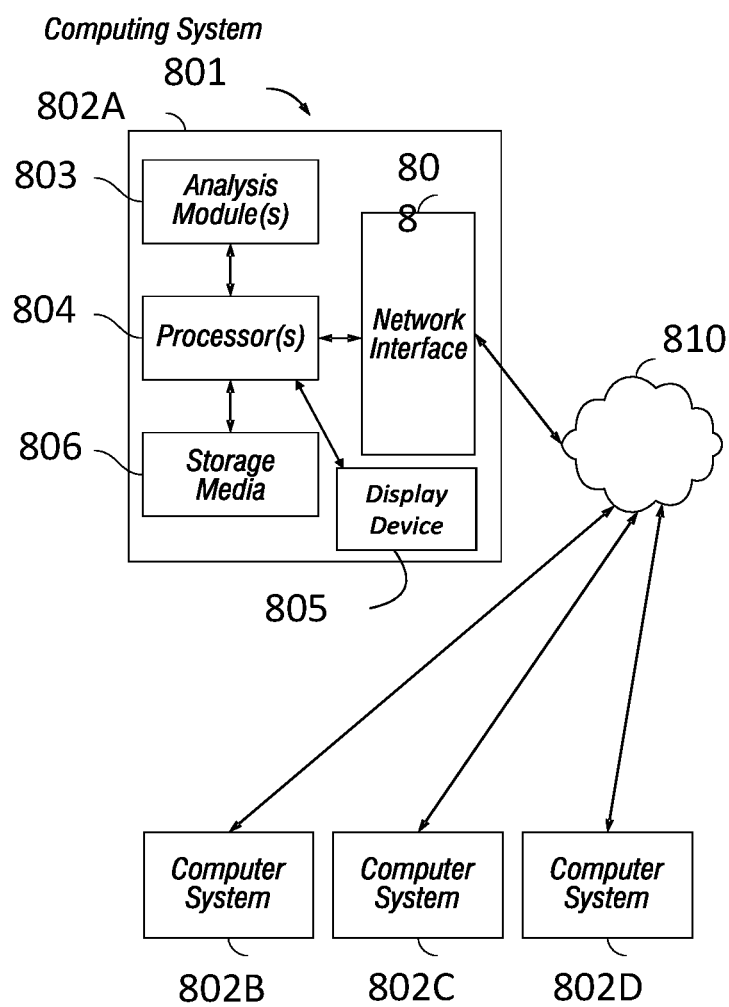
FIG. 8 shows a computing system that can be used to implement the described method.

The methods disclosed herein may be performed and automated in a microcomputer or other processor. FIG. 8 shows a computing system that can be used to implement the described method. The computing system 801 may be an individual computer system 802A or an arrangement of distributed computer systems. The individual computer system 802A may include one or more analysis modules 803 that may be configured to perform various tasks according to some embodiments, such as the tasks explained with reference to FIG. 8. To perform these various tasks, the analysis module 803 may operate independently or in coordination with one or more processors 804, which may be connected to one or more storage media 806. A display device 805, such as a graphic user interface of any known type, may be in signal communication with the processor 804 to enable user entry of commands and/or data and to display results of the execution of a set of instructions according to the present disclosure.

The processor(s) 804 may also be connected to a network interface to allow the individual computer system 802A to communicate over a data network Sorry with one or more additional individual computer systems and/or computing systems, such as 802B, 802C, and/or 802D (note that computer systems 802B, 802C and/or 802D may or may not share the same architecture as computer system 802A, and may be located in different physical locations, for example, computer systems 802A and 802B may be at a well drilling location, while in communication with one or more computer systems such as 802C and/or 802D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 806 may be implemented as one or more computer-readable or machine-readable storage media. Note that while in the example embodiment of FIG. 8 the storage media 806 are shown as being disposed within the individual computer system 802A, in some embodiments, the storage media 806 may be distributed within and/or across multiple internal and/or external enclosures of the individual computing system 802A and/or additional computing systems, e.g., 802B, 802C, 801D. Storage media 806 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing systems having one or more nodes. Such a computer-readable or machine-readable storage medium or media may be considered to be part of an article (or article of manufacture). An article or article of manufacture can refer to any manufactured single component or multiple components. The storage medium or media can be located either in the machine running the machine-readable instructions or located at a remote site from which machine-readable instructions can be downloaded over a network for execution.

It should be appreciated that the computing system is only one example of a computing system and that any other embodiment of a computing system may have more or fewer components than shown, may combine additional components not shown in the example embodiment of FIG. 8, and/or the computing system may have a different configuration or arrangement of the components shown in FIG. 8. The various components shown in FIG. 8 may be implemented in hardware, software, or a combination of both hardware and software, including one or more signal processing and/or application-specific integrated circuits.

Further, the acts of the processing methods described above may be implemented by running one or more functional modules in information processing apparatus such as general-purpose processors or application-specific chips, such as ASICs, FPGAs, PLDs, or other appropriate devices. These modules, combinations of these modules, and/or their combination with general hardware are all included within the scope of the present disclosure.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A method for treating a well, comprising:
hydraulically isolating an interval in a first well having a plurality of axially spaced apart intervals along the first well, each axially spaced apart interval having been fracture treated;
inducing a tube wave in the first well in the isolated interval;
detecting reflections in the first well from the induced tube wave;
determining hydraulic boundary condition and hydraulic conductivity of a fracture connected to the first well in the isolated interval using the detected reflections; and
performing a refracture treatment in the isolated interval when the hydraulic boundary condition and the hydraulic conductivity are within a predetermined range, wherein the performing a refracture treatment is performed while the isolated interval remains isolated.

2. The method of claim 1 wherein the refracture treatment is not performed when the hydraulic boundary condition is above a first selected threshold.

3. The method of claim 2 wherein the first threshold value is determined prior to the hydraulically isolating the interval.

4. The method of claim 3 wherein the second threshold value is determined prior to the hydraulically isolating the first interval.

5. The method of claim 2 wherein the refracture treatment is not performed when the hydraulic conductivity is above a second selected threshold.

6. The method of claim 5 wherein the second threshold is determined based on a fracture conductivity determined after an initial fracture treatment of the interval.

7. The method of claim 1 further comprising: hydraulically isolating a subsequent interval in the first well; repeating the inducing a tube wave, detecting reflections, determining hydraulic boundary condition and hydraulic conductivity; and
performing a refracture treatment in the subsequent interval.

8. The method of claim 1 further comprising performing the inducing a tube wave, detecting reflections, determining hydraulic boundary condition and hydraulic conductivity in a second well proximate to the first well, and omitting the performing the refracture treatment in the isolated interval when the hydraulic boundary condition and hydraulic conductivity in the second well indicate pressure communication between the first well and the second well.

9. The method of claim 1 wherein the inducing a tube wave comprises inducing a pressure pulse.

10. The method of claim 9 wherein the pressure pulse is induced by water hammer.

11. The method of claim 1 further comprising repeating the inducing a tube wave, detecting reflections, determining hydraulic boundary condition and hydraulic conductivity; and performing a refracture treatment in the isolated interval when the hydraulic boundary condition is within a first selected threshold or the hydraulic conductivity is within a second selected threshold.

12. The method of claim 11 wherein the isolating the interval is performed by inflating spaced apart packers along a coiled tubing extended into the first well.

13. The method of claim 12 wherein the refracture treatment is performed using the coiled tubing as a fluid conduit.

14. The method of claim 1 further comprising at least measuring pressure in a second well to determine presence of fluid communication between the first well and the second well.

15. The method of claim 1 wherein the type of refracturing treatment is based on measured fracture properties.

16. The method of claim 1 wherein a remediation of a previously fracture treated interval in the first well is performed using at least one of diverters, abrasive proppant, and reperforating the previously fracture treated interval.

* * * * *